(12) United States Patent
Gregory et al.

(10) Patent No.: US 8,866,918 B2
(45) Date of Patent: Oct. 21, 2014

(54) OPTICAL IMAGE STABILISATION

(75) Inventors: Thomas Matthew Gregory, Cambridge (GB); Richard Topliss, Princeton, NJ (US)

(73) Assignee: Cambridge Mechatronics Limited, Cambridge (GB)

(*) Notice: Subject to any disclaimer, the term of this patent is extended or adjusted under 35 U.S.C. 154(b) by 61 days.

(21) Appl. No.: 13/825,382

(22) PCT Filed: Sep. 22, 2011

(86) PCT No.: PCT/GB2011/001384
§ 371 (c)(1),
(2), (4) Date: May 22, 2013

(87) PCT Pub. No.: WO2012/038703
PCT Pub. Date: Mar. 29, 2012

(65) Prior Publication Data
US 2014/0055630 A1    Feb. 27, 2014

(30) Foreign Application Priority Data

Sep. 22, 2010  (GB) .................................... 1015874.9
Jan. 10, 2011  (GB) .................................... 1100350.6
Jul. 1, 2011   (GB) .................................... 1111330.5

(51) Int. Cl.
| | |
|---|---|
| H04N 5/228 | (2006.01) |
| H04N 5/232 | (2006.01) |
| H04N 5/225 | (2006.01) |
| G03B 3/02  | (2006.01) |
| F03G 7/06  | (2006.01) |
| G02B 27/64 | (2006.01) |

(52) U.S. Cl.
CPC ....... *H04N 5/23258* (2013.01); *H04N 5/23287* (2013.01); *H04N 5/23261* (2013.01); *H04N 5/2257* (2013.01); *G03B 3/02* (2013.01); *F03G 7/065* (2013.01); *G02B 27/646* (2013.01); *G03B 2205/0076* (2013.01); *G03B 2205/0023* (2013.01)

USPC ............... 348/208.2; 348/208.99; 348/208.7; 348/208.1

(58) Field of Classification Search
CPC .................... G02B 27/646; G03B 2205/0076; G03B 2205/0023
USPC .......................................... 348/208.1–208.99
See application file for complete search history.

(56) References Cited

U.S. PATENT DOCUMENTS

| | | | |
|---|---|---|---|
| 4,977,886 A | 12/1990 | Takehana et al. | |
| 5,365,279 A * | 11/1994 | Harford ........................ 348/678 |

(Continued)

FOREIGN PATENT DOCUMENTS

| | | |
|---|---|---|
| EP | 1304872 A1 | 4/2003 |
| EP | 2 003 489 A2 | 12/2008 |

(Continued)

OTHER PUBLICATIONS

International Search Report and Written Opinion for PCT/GB2011/0013894, mailed May 29, 2012, ISA/EP.

*Primary Examiner* — Chia-Wei A Chen

(74) *Attorney, Agent, or Firm* — Harness, Dickey & Pierce, P.L.C.

(57) ABSTRACT

A camera apparatus capable of providing optical image stabilization comprises: a support structure; a camera unit comprising an image sensor and a lens system; a suspension system comprising a plurality of flexure elements supporting the camera unit on the support structure in a manner allowing the camera unit to tilt; and a plurality of SMA actuators. A sensor arrangement, whose output is used as the basis for generating drive signals, is mounted on the camera unit. A control circuit generates drive signals for the SMA actuators, by deriving closed-loop control signals representative of a desired degree of variation in the power of the drive signals from the output signals of the sensor arrangement without dependence on any measurement of the resistance of the SMA actuators, and generating the drive signals with powers that varies from a set-point power in correspondence with the closed-loop control signal.

23 Claims, 4 Drawing Sheets

(56) References Cited

U.S. PATENT DOCUMENTS

| | | | |
|---|---|---|---|
| 5,459,544 A | 10/1995 | Emura | |
| 5,763,979 A | 6/1998 | Mukherjee et al. | |
| 5,831,671 A * | 11/1998 | Chigira et al. | 348/208.8 |
| 6,449,434 B1 | 9/2002 | Fuss | |
| 6,459,855 B1 | 10/2002 | Kosaka et al. | |
| 6,516,146 B1 | 2/2003 | Kosaka | |
| 6,554,501 B2 | 4/2003 | Kosaka et al. | |
| 6,574,958 B1 | 6/2003 | MacGregor | |
| 6,945,045 B2 | 9/2005 | Hara et al. | |
| 8,072,318 B2 * | 12/2011 | Lynam et al. | 340/438 |
| 8,125,711 B2 * | 2/2012 | Kimura | 359/554 |
| 8,588,598 B2 * | 11/2013 | Topliss et al. | 396/72 |
| 8,593,568 B2 * | 11/2013 | Topliss et al. | 348/374 |
| 8,629,935 B2 * | 1/2014 | Kikuchi et al. | 348/372 |
| 2001/0002226 A1 | 5/2001 | Tanaka et al. | |
| 2001/0025477 A1 | 10/2001 | Hara et al. | |
| 2002/0001467 A1 | 1/2002 | Tanaka et al. | |
| 2002/0113499 A1 | 8/2002 | von Behrens et al. | |
| 2003/0079472 A1 | 5/2003 | Hara et al. | |
| 2004/0012348 A1 * | 1/2004 | Lee et al. | 315/366 |
| 2006/0048511 A1 | 3/2006 | Everson et al. | |
| 2006/0150627 A1 | 7/2006 | Oohara | |
| 2006/0209195 A1 | 9/2006 | Goto | |
| 2006/0266031 A1 | 11/2006 | Kosaka et al. | |
| 2006/0272328 A1 | 12/2006 | Hara et al. | |
| 2007/0109412 A1 | 5/2007 | Hara | |
| 2008/0122941 A1 * | 5/2008 | Kikuchi et al. | 348/222.1 |
| 2008/0247748 A1 | 10/2008 | Tanimura et al. | |
| 2008/0278030 A1 | 11/2008 | Hara et al. | |
| 2008/0278590 A1 | 11/2008 | Tanimura et al. | |
| 2009/0009656 A1 | 1/2009 | Honda et al. | |
| 2009/0052037 A1 | 2/2009 | Wernersson | |
| 2010/0074608 A1 * | 3/2010 | Topliss | 396/133 |
| 2010/0257859 A1 | 10/2010 | Honda | |
| 2010/0320943 A1 | 12/2010 | Honda | |
| 2011/0031924 A1 | 2/2011 | Honda | |
| 2011/0032628 A1 | 2/2011 | Tanimura et al. | |
| 2011/0169990 A1 * | 7/2011 | Higuchi et al. | 348/302 |

FOREIGN PATENT DOCUMENTS

| | | |
|---|---|---|
| EP | 2397826 A1 | 12/2011 |
| JP | A-09-127398 | 5/1997 |
| JP | 2007315352 A | 12/2007 |
| JP | 2009086142 A | 4/2009 |
| WO | WO-2005/026539 A2 | 3/2005 |
| WO | WO-2005075823 A1 | 8/2005 |
| WO | WO-2006054535 A1 | 5/2006 |
| WO | WO-2006059098 A1 | 6/2006 |
| WO | WO-2006105588 A1 | 10/2006 |
| WO | WO-2007018086 A1 | 2/2007 |
| WO | WO-2007/113478 A1 | 10/2007 |
| WO | WO-2008/099156 A2 | 8/2008 |
| WO | WO-2009/056822 A2 | 5/2009 |
| WO | WO-2009-071898 A2 | 6/2009 |
| WO | WO-2010/029316 A2 | 3/2010 |
| WO | WO-2010049689 A2 | 5/2010 |
| WO | WO-2010/073902 A1 | 7/2010 |
| WO | WO-2010/089529 A1 | 8/2010 |

* cited by examiner

OPTICAL IMAGE STABILISATION

CROSS-REFERENCE TO RELATED APPLICATIONS

This application is a 371 U.S. National Stage of International Application No. PCT/GB2011/001384, filed on Sep. 22, 2011, which claims priority to British Patent Application No. 1015874.9, filed on Sep. 22, 2010, British Patent Application No. 1100350.6, filed on Jan. 10, 2011, and British Patent Application No. 1111330.5, filed on Jul. 1, 2011. The contents of the above applications are herein incorporated by reference in their entirety.

The present invention relates to optical image stabilisation (OIS) in a camera apparatus comprising an image sensor and a lens system for focussing an image on the image sensor.

The purpose of OIS is to compensate for camera shake, that is vibration of the camera apparatus, typically caused by user hand movement, that degrades the quality of the image captured by the image sensor. OIS typically involves detection of the vibration by a sensor arrangement such as a gyroscope sensor, and control on the basis of the detected vibration of an actuator arrangement that adjusts the camera apparatus to compensate the captured image for the vibration.

Several techniques for adjusting the camera apparatus are known. In one type of technique, the captured image is processed. However, this requires significant processing power. In another type of technique, the optical system of the camera is adjusted mechanically. Some examples of this type of technique are as follows. One technique typically employed in digital stills cameras is to keep the position of the camera apparatus as a whole fixed (including the image sensor and often much of the lens system) and to move one lens group in directions perpendicular to the optical axis. This technique is particularly suitable to large cameras as the lens group is of low size and inertia as compared to the remainder of the camera. Another technique is to keep the lens system still, and to move the image sensor in directions perpendicular to the optical axis.

Although these techniques are successful in relatively large camera apparatuses such as digital still cameras, they are difficult to miniaturise. The very tight packaging of components in miniature camera apparatuses presents great difficulties in adding OIS actuators within the desired package.

WO-2010/029316 and WO-2010/089529 both disclose an alternative technique of the type in which the optical system of the camera is adjusted mechanically. In this technique, the camera unit comprising an image sensor and a lens system for focussing an image on the image sensor is tilted relative to the support structure of the camera around two notional axes that are perpendicular to each other and to the optical axis of the lens system. WO-2010/029316 and WO-2010/089529 disclose in particular actuation arrangements comprising a plurality of SMA actuators arranged to drive tilting of the camera unit. This technique provides a number of advantages. As OIS is achieved by tilting the entire camera unit, it is unnecessary to alter the complex internal design of the camera unit, such as the highly toleranced optical components. Such tilting is particular suitable for a relatively small camera, because the size and inertia of the camera unit is small. Furthermore, by using SMA actuators, there are achieved the intrinsic advantages of SMA, such as providing a very high energy density (mechanical energy available for a given mass of material) thereby allowing the actuator arrangement to be relatively small and deliver relatively high forces.

For controlling the SMA actuators, WO-2010/029316 and WO-2010/089529 disclose the use of a control circuit to supply drive signals to the SMA actuators. The control circuit generates the drive signals in response to the output signals of a sensor arrangement mounted on the support structure or the camera unit and arranged to generate output signals representative of the vibration of the camera arrangement. The drive signals are generated by deriving control signals indicating a demanded angle of tilt from the output signals of the sensor arrangement and then using the control signals as the demands for a closed-loop control using resistance-feedback. In the control loops, a detection circuit detects the resistance of the SMA actuator and a drive controller uses the detected resistance as a feedback signal in a closed-loop control algorithm to derive the drive signal in accordance with the demand represented by the control signal.

The implementation of resistance-feedback in this manner in the control circuit is relatively complex but has the advantage of providing accurate control because the contraction and expansion of the SMA actuator is approximately linear with its electrical resistance, over the functional movement range. SMA actuators have non-linearities and variations in their response, for example due to the significant inherent non-linearity and strain/power hysteresis of SMA material and due to part and assembly variation. This can be minimised using closed-loop resistance-based control, although for high performance OIS products, calibration during manufacture is likely to be required to overcome the remaining hysteresis, assembly variation and material property variation.

It would be desirable to simplify the control circuit provided that sufficient accuracy of the OIS can be maintained.

According to an aspect of the present invention, there is provided a camera apparatus comprising:
  a support structure;
  a camera unit comprising an image sensor and a lens system for focussing an image on the image sensor, the camera unit being supported on the support structure in a manner allowing the camera unit to tilt relative to the optical axis of the lens system;
  a plurality of SMA actuators arranged to drive tilting of the camera unit;
  a sensor arrangement mounted on the camera unit and arranged to generate output signals representative of the movement of the camera unit; and
  a control circuit arranged to generate drive signals and supply them to the SMA actuators, wherein
  the control circuit is arranged to derive closed-loop control signals representative of a desired degree of variation in the power of the drive signals from the output signals of the sensor arrangement for reducing the movement of the camera unit, without dependence on any measurement of the resistance of the SMA actuators, and
  the control circuit is arranged to generate the drive signals with powers that vary from setpoint powers in correspondence with the closed-loop control signal.

It has been appreciated that simplification of the control circuit can be achieved by mounting the sensor arrangement on the camera unit, rather than the support structure, and performing closed-loop control of the powers of the drive signals, in which the drive signals have powers that vary from a set-point power in correspondence with closed-loop control signals representative of a desired degree of variation in the power of the drive signals from the output signals of the sensor arrangement for reducing the movement of the camera unit. The drive signals may be derived without dependence on any measurement of the resistance of the SMA actuators. Such a control circuit is very simple to implement, not only because no detection circuit is required to detect the resistance of the SMA actuator, but more significantly because the closed-loop control algorithm is much simpler. In particular, as a result of the sensor arrangement being mounted on the camera unit which is the moving part to be stabilised, accurate control can be achieved by a simple closed-loop control that drives the output signals of the sensor arrangements to nulls.

This allows sufficient accuracy to be achieved, despite the non-linearities and variations in the response of the SMA actuators. It has been appreciated that the closed-loop control of power is far less sensitive to those non-linearities and variations simply by using a large control loop gain. Even without calibration of the control circuit, the control loop can maintain nulls in the output signals of the sensor arrangement and thus perform well.

The control loop may implement a proportional control algorithm in which the closed-loop control signal is derived to be proportional to the position of the camera unit. Alternatively, the control loop may implement a more complex control algorithm such as proportional-integral control in which the closed-loop control signal includes a component that is derived to be proportional to the position of the camera unit and a further component derived to be proportional to the integral of the position of the camera unit.

The control may be implemented using a sensor arrangement arranged to generate output signals representative of the angular velocity of the camera unit, for example a gyroscope sensor arrangement. In this case, the control circuit may be arranged to integrate the output signals of the sensor arrangement to derive a measure of the position of the camera unit and to derive the closed-loop control signal from the derived measure of the position of the camera unit.

The set-point powers determine the length of the SMA actuators and hence the position of the camera unit relative to the support structure in the absence of vibration, which is the centre of the oscillatory movement of the camera unit relative to the support (which the OIS aims to be a fixed absolute position of the camera unit). The set-point powers may be selected to position the camera unit sufficiently far from the limits of the movement relative to the support structure to provide correction of the desired magnitude of vibration. Selecting the set-point power to position the camera unit at the centre of its range of movement relative to the support structure advantageously achieves correction of the maximum possible magnitude of vibration. The set-point power corresponding to any desired position depends on the physical arrangement of the camera apparatus and in particular the SMA actuators, including the mechanical and thermal properties. In addition, depending on the physical arrangement, the set-point power corresponding to any desired position may vary with ambient temperature.

Whilst the set-point power for operation at a given ambient temperature may be determined in advance for a given physical arrangement, advantageously the control circuit is arranged to select the set-point power. This allows the set-point power to vary with ambient temperature for optimal performance over typical consumer electronics temperature ranges. There are a variety of approaches to achieve this selection.

In one approach, the control circuit is arranged to select the set-point powers on the basis of a measure of ambient temperature in the vicinity of the SMA actuators. This selection may be performed using a look-up-table or a simple equation to define the set-point power and range. Such an estimate can be used stand-alone or to provide a start-point of a second finer search.

In one example of this approach, the control circuit includes a temperature sensor for measurement of the ambient temperature, the output signal of which is used as the measure of ambient temperature. In practical terms, the required accuracy of temperature measurement is relatively low, thereby allowing advantage to be taken of temperature sensors that are commonly provided in consumer electronics apparatuses for other purposes. For example, use may be made of a temperature sensor that may be provided in the vibration sensor unit, as is typically the case for typical MEMS (micro-electromechanical systems) products.

In another example of this approach, the control circuit is arranged to determine the measure of temperature from measured electrical characteristics of the SMA actuators, for example based on the measured resistance of the SMA actuators, or from measured electrical characteristics of a further SMA actuator, in cases where this is provided to drive movement of the lens system relative to the camera support to change the focus of an image on the image sensor. Such measured electrical characteristics of the SMA actuators may be, for example, based on the measured resistance of the SMA actuators.

For improved accuracy, the control circuit may be arranged to derive an estimate of at least one characteristic temperature of the SMA actuation apparatus, including the ambient temperature in the vicinity of the SMA actuators, on the basis of the power of the drive current, using a thermal model that relates the at least one characteristic temperature of the SMA actuation apparatus to the power of the drive current. It has been appreciated that a thermal model may be used to derive estimates of one or more characteristic temperatures of the SMA actuator apparatus based on the history of the power that has been supplied over time, one of which characteristic temperatures representing the ambient temperature in the vicinity of the SMA actuators. The thermal model is effectively an open-loop model to estimate the temperature of the surrounding components of the SMA actuaotrs, for example by assuming one or more thermal time constants in series, combined with a cumulative assessment of the power applied to the SMA actuator, together with knowledge of the background ambient temperature of the camera apparatus, to which the heat dissipates. The parameters of the thermal model and the resistance model are related to the specific mechanical arrangement of the SMA apparatus and so may be determined by experiment. The thermal model may also be based on ambient temperature, so the method may be improved by determining the ambient temperature and taking this into account.

In another approach, the control circuit is arranged to select the set-point powers on the basis of the output signals of the vibration sensor. Typically, the response of the SMA actuators (i.e. the magnitude of movement with respect to a given change in the power of the drive signal) is greatest at the centre of the range of movement which corresponds to the most desirable set-point power. Hence it is possible to use the output signals of the vibration signal to select the set-point power.

In one example of this approach, the control circuit may be arranged to perform a set-point power selection process comprising:

supplying the SMA actuators with dithered drive signals having a power that dithers and has a changing average power over a predetermined period, for example a dithered power ramp;

monitoring the output signals of the sensor arrangement while said dithered drive signals are supplied; and selecting the set-point powers to be the average power of the dithered drive signals when the output signals of the sensor arrangement indicate that the movement of the camera unit is maximised.

In one possible implementation, the control circuit comprises: a drive circuit arranged to generate the drive signals in correspondence with power control signals; and a controller arranged to generate the power control signals, for example by adding the closed-loop control signals to set-point control signals for causing the drive signal to have the set-point powers.

Thus, according to further aspects of the present invention, there are provided a method of controlling a drive circuit and a controller for controlling a drive circuit which implement a similar manner of control to the first mentioned aspect of the present invention.

The controller may be implemented in a semiconductor chip, and due to the simple nature of the control algorithm achieved by the present invention, in many applications it is possible to implement the controller in the same semiconductor chip as the sensor arrangement. The sensor arrangement might typically be provided in a chip with some limited processing power and the possibility of implementing the controller in that same chip is advantageous.

To allow better understanding, an embodiment of the present invention will now be described by way of non-limitative example with reference to the accompanying drawings, in which.

Figure 1:
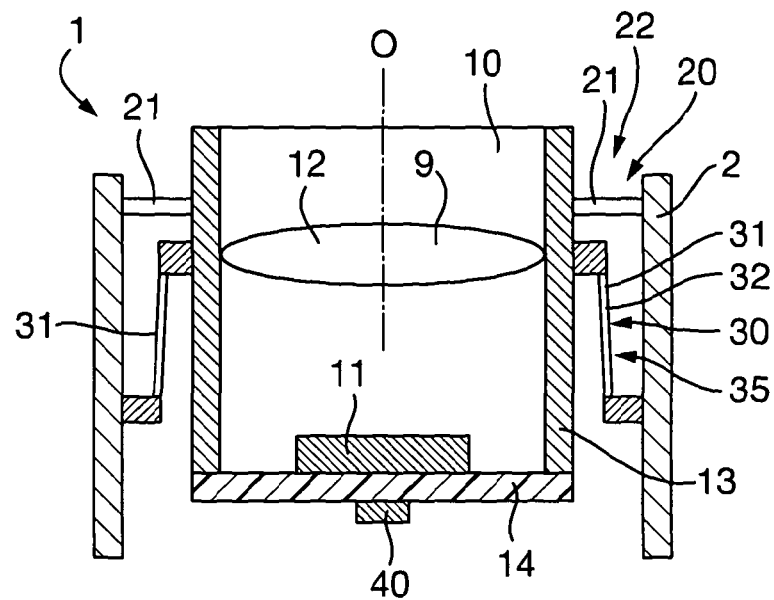
FIG. 1 is a schematic cross-sectional view of a camera apparatus.

A camera apparatus 1 arranged to perform OIS is shown schematically in FIG. 1 which is a cross-sectional view, the cross-section being taken along the optical axis O of the camera apparatus 1. The camera apparatus 1 is to be incorporated in a portable electronic device such as a mobile telephone, media player or portable digital assistant. Thus, miniaturisation is an important design criterion.

The camera apparatus 1 comprises a support structure 2 and a camera unit 10 that is supported on the support structure 2 by a suspension system 20. The camera apparatus 1 also includes an SMA actuator system 30 connected between the support structure 2 and the camera unit 10.

The camera unit 10 is a functional camera and comprises an image sensor 11 and a lens system 12, both supported on a camera support 13. The camera unit 10 has a printed circuit board (PCB) 14 on its bottom surface to which the image sensor 11 is mounted and connected. The lens system 12 and the image sensor 11 are arranged along the optical axis O so that the lens system 12 focuses an image onto the image sensor 11. The image sensor 11 captures the image and may be of any suitable type for example a CCD (charge-coupled device) or a CMOS (complimentary metal-oxide-semiconductor) device. The camera unit 1 is a miniature camera in which the lens system has one or more lenses 9 with a diameter of at most 10 mm.

OIS is provided by tilting the entire camera unit 10 around axes that are perpendicular to the optical axis O, with the advantage that the internal construction of the camera unit 10 need not be adapted for this purpose. Thus, the camera unit 10 may be a functionally standard camera. Thus, the camera unit 10 may have any desired construction to provide the desired optical performance, irrespective of the OIS function. For example, the camera unit 10 may include a lens system 12 comprising a single lens or plural lenses as needed to provide the desired balance of optical performance and cost.

The lens system 12 may provide a fixed focus as shown in FIG. 1 or may be modified to provide a variable focus. In the latter case, the camera unit 10 may employ any suitable construction for varying the focus, including the use of an SMA actuator system.

Figure 2:
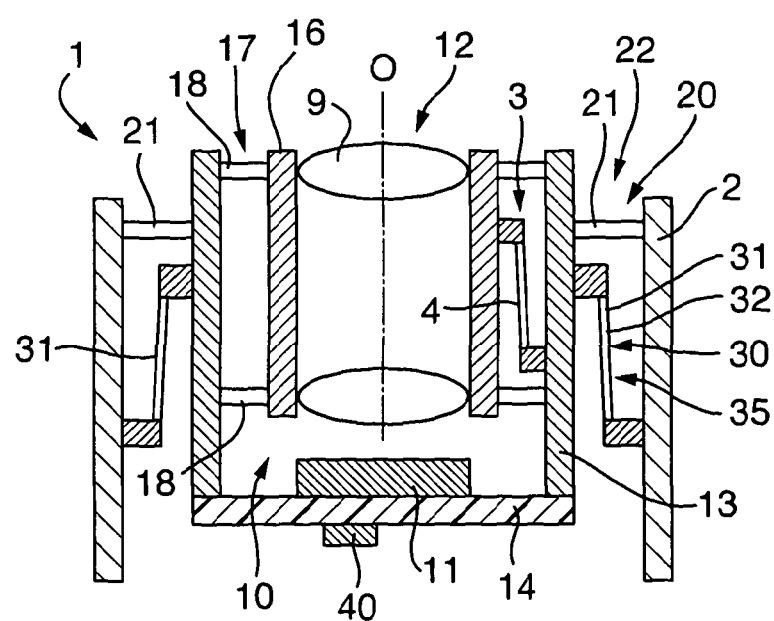
FIG. 2 is a schematic cross-sectional view of the camera apparatus with a modification including a variable focus lens system.

FIG. 2 is a schematic view of the camera apparatus 1 with a modification to camera unit 10 so that the lens system 12 provides a variable focus. The lens system 12 comprises one or more lenses 9 held by a lens element 16. The lens element 16 is suspended on the camera support 13 by a suspension system 17 consisting of plural flexures 18 connected between the camera support 13 and the lens element 16. The suspension system 17 guides movement of the lens element 16 along the optical axis O. Such movement of the lens element 6 changes the focus of the image formed on the image sensor 4.

In addition, the camera unit 10 comprises an SMA actuation system 3 that comprises one or more SMA actuators 4 connected between the camera support 13 and the lens element 16 and arranged to drive movement of the lens element 16, and hence the lens system 13, relative to the camera support 13. The SMA actuators 4 may be pieces of SMA wire. The position of the lens system 12 relative to the camera support 13 along the optical axis O, and hence the variable focus, is controlled by providing drive signals to the SMA actuation system 3 to vary the temperature of the SMA actuators 4.

The camera unit 10 shown in FIG. 2 may be a camera of the type described in WO-2007/113478, WO-2008/099156 or WO-2009/056822, which are incorporated herein by reference, and to which reference is made for possible detailed constructions and possible operation of the camera unit 10.

The suspension system 20 comprises a set of flexures 21 each connected between the support structure 2 and the camera unit 10 to support the camera unit 10 on the support structure 2. The flexures 21 are arranged as beams having a greater width as viewed along the optical axis O than thickness as viewed perpendicular to the optical axis O to allow deflection along the optical axis O while resisting movement perpendicular to the optical axis O. Thus, the flexures 21, upon deflection thereof, allow movement of the camera unit 10 along the optical axis O allows tilting of the camera unit 10 about any arbitrary axis perpendicular to the optical axis O. Groups of the flexures 21 may form subsystems 22 of the suspension system 20 that each allowing tilting of the camera unit 10 around a respective notional axis perpendicular to the optical axis O. For example, there may be two subsystems 22 of the suspension system 20 that allowing tilting of the camera unit 10 around perpendicular notional axes, or there may be more than two subsystems 22.

The flexures 21 may have a variety of arrangements but are typically spaced symmetrically around the camera unit 10 to provide similar stiffness against motion in different directions perpendicular to the optical axis O. For example, if the camera unit 10 is square as viewed along the optical axis O, then one or two flexures may be disposed on each side of the camera unit 10. In this case the suspension system 20 allows tilting of the camera unit 10 around a notional axis that is perpendicular to the optical axis O, upon differential deflection of the flexures 21 arranged on opposite sides of the camera unit 10.

The entire suspension system 20 consisting of all the flexures 21 may be formed from a single piece of material, typically a metal, although each of the flexures 21 could equally be formed as a separate element.

The use of flexures 21 as compared to other types of suspension system provides advantages, in particular being compact and straightforward to manufacture whiles providing a low stiffness along the optical axis O and a high stiffness in perpendicular directions. Similarly, the flexures 21 experience a minimal degree of friction against movement as compared to other suspension systems, for example a bearing.

In cooperation with the suspension system 20, the SMA actuator system 30 comprises plural SMA actuators 31 arranged to drive the tilting of the camera unit 10 about any arbitrary axis perpendicular to the optical axis O.

The SMA actuators 31 are made of any suitable SMA material, for example Nitinol or another Titanium-alloy SMA material. SMA material has the property that on heating it undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus, heating of the piece of SMA actuator 31 causes it to decrease in length.

On heating of one of the SMA actuators 31, the stress therein increases and the SMA actuator 31 contracts. This causes movement of the camera unit 10 along the optical axis O relative to the support structure with a range of movement occurring as the temperature of the SMA actuator 31 increases over the range of temperature of the phase transition. Conversely, on cooling of the SMA actuator 31 so that the stress therein decreases, and expansion of the SMA actuator 31 allows the camera to move in the opposite direction.

The position of the camera unit 10 relative to the support structure 2 along the optical axis O is controlled by varying the temperature of the SMA actuators 31. This is achieved by passing through the SMA actuator 31 a drive signal that provides resistive heating. Cooling is provided by reducing or ceasing the drive signal to allow the SMA actuator 31 to cool by conduction to its surroundings. The degree of displacement achievable along the optical axis O is dependent on the mechanical arrangement of the SMA actuators 31 and the strain developed within them.

The actuators 31 are arranged in subsystems 35 each comprising plural actuators 31 wherein differential contraction of the actuators 31 of a single subsystem 35 drives rotation of the camera unit 10 around a respective notional axis perpendicular to the optical axis O. The notional axes of each subsystem 35 are disposed in different directions, for example perpendicular to each other in the case of the SMA actuator system 30 comprising two subsystems 35, to provide tilting about any arbitrary notional axis perpendicular to the optical axis O. The configuration of the SMA actuator system 30 creates the desired virtual pivot for the camera unit 10 by operating all the SMA actuators 31 with controlled drive signals.

Such an arrangement of subsystems 35 simplifies the nature of the control provided, but in general the number of SMA actuators 20 may be changed, provided there are at least three SMA actuators 20 to be capable of providing tilt around two perpendicular notional axes.

The mechanical arrangement of the camera apparatus 1 may take a variety of forms.

In one type of mechanical arrangement, the camera apparatus 1 may take the form of any of the first to third arrangements of WO-2010/029316 to which reference is made and which is incorporated herein by reference.

Figure 3:
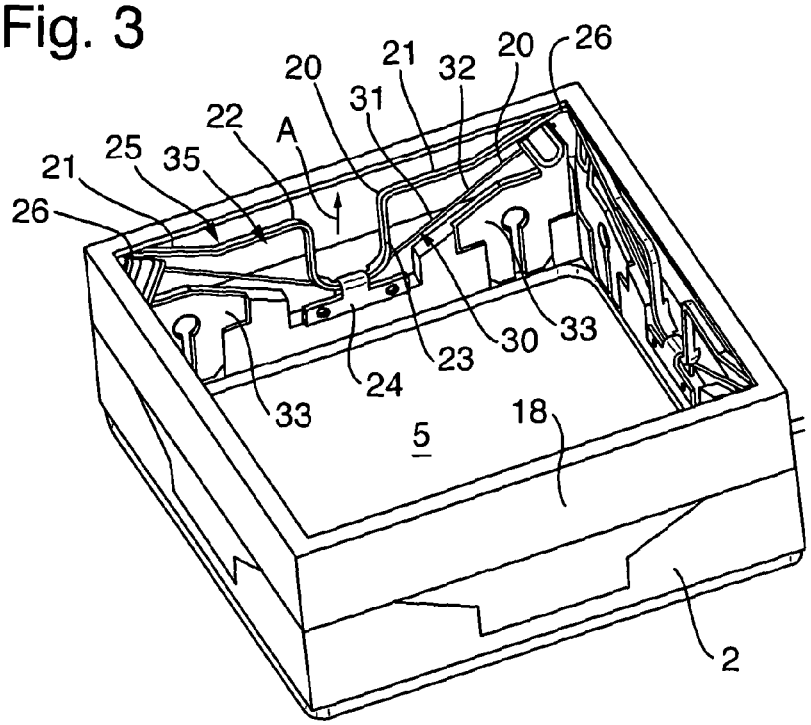
FIG. 3 is a perspective view of a possible arrangement of the camera apparatus, omitting the camera unit.

For example, in accordance with the first arrangement described in WO-2010/029316, the camera apparatus 1 may take the form shown in FIG. 3, in which the camera unit 10 is omitted in order to illustrate the components of the suspension system 20.

In this arrangement, the suspension system 20 comprises four flexures elements 22 (two of which may be seen in FIG. 3) each comprising a pair of flexures 21 extending along one side of the support structure 2 outwardly from an intermediate portion 23 having a mount 24 on the innermost side to which the camera unit 10 is connected. The flexures 21 extend from the intermediate portions 23 to corner portions 26 that are themselves connected to the corners of the chassis 3. The entire suspension system 20 consisting of all four flexure elements 22 is formed from a single piece of material, typically a metal.

The flexures 21 have a greater width as viewed along the optical axis O than thickness as viewed perpendicular to the optical axis O to allow deflection along the optical axis O while resisting movement perpendicular to the optical axis O. Thus, the flexures 21 support the camera unit 10 on the support structure 2, allowing movement of the camera unit 10 along the optical axis O upon deflection of the flexures 21. A pair of flexure elements 22 on opposite sides of the support structure 2 together form a subsystem 25 that upon differential deflection allows tilting of the camera unit 10 around a notional axis perpendicular to the optical axis O. The notional axes of the two subsystems 25 are perpendicular, so that the suspension system 20 also allows tilting about any arbitrary axis perpendicular to the optical axis O.

The SMA actuator system 30 comprises four SMA actuators 31 each comprising a piece of SMA wire 32 mounted between two crimping members 33 that crimp the piece of SMA wire 32 and are fixed to the support structure 2, so that each SMA actuator 31 extends perpendicular to a notional line radial of the optical axis O. Each piece of SMA wire 32 is arranged adjacent one of the flexure elements 11, hooked over the intermediate portion 23 so that each piece of SMA wire 32 extends between the camera unit 10 and the support structure 2 at an acute non-zero angle to the optical axis O. In this configuration, the SMA actuator 31 is held in tension by the flexures 21, thereby applying a component of force in a direction A along the optical axis O. This deflects the flexures 21 which thereby provide a biassing force reacting against the SMA actuator 20 in a direction opposite to direction A.

A pair of SMA actuators 31 on opposite sides of the support structure 2 together form a subsystem 35 that upon differential actuation allows tilting of the camera unit 10 around a notional axis perpendicular to the optical axis O and parallel to the sides of the support structure 2 along which the SMA actuators 31 extend. Thus, the notional axes of the two subsystems 35 are perpendicular, so that the SMA actuator system 30 is capable of driving tilting about any arbitrary axis perpendicular to the optical axis O on selective actuation of the two subsystems 35.

Reference is made to WO-2010/029316 for further details of the first arrangement thereof, and also details of the second and third arrangements thereof, that may be applied in the camera apparatus 1 described herein.

In another type of mechanical arrangement, the camera apparatus 1 may take the form of either of the first or second arrangements of WO-2010/089529 to which reference is made and which is incorporated herein by reference.

Figure 4:
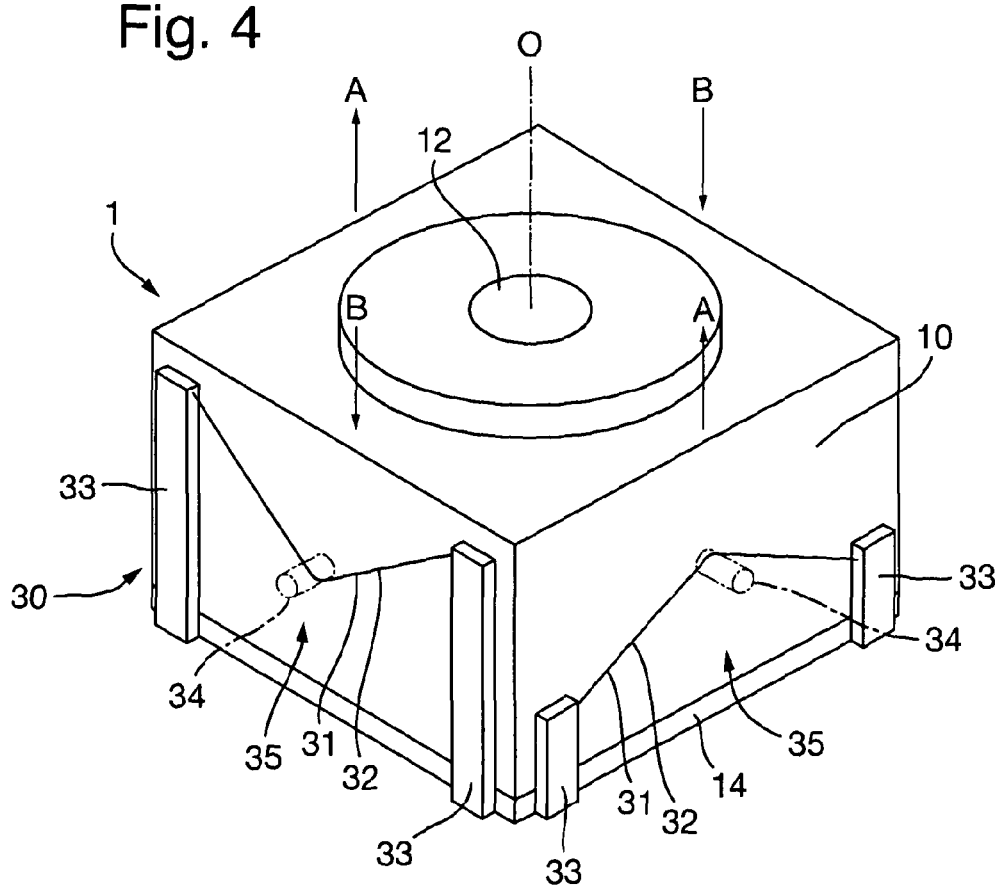
FIG. 4 is a perspective view of another possible arrangement of the camera apparatus, omitting its support structure.

For example, in accordance with the first arrangement described in WO-2010/089529, the camera apparatus 1 may take the form shown in FIG. 4, in which the support structure 2 and suspension system 20 are omitted for clarity.

In this arrangement, the SMA actuator system 30 comprises four SMA actuators 31 arranged as follows. Two of the actuators 31 are visible in FIG. 3, there being two more actuators 31 on the opposite sides of the camera unit 10 that are mirror images the two actuators 31 that can be seen, in perpendicular notional planes through the optical axis O.

Each SMA actuator 31 comprises a piece of SMA wire 32 mounted between two crimping members 33 that crimp the piece of SMA wire 32 at each end and are each fixed to the camera unit 10. Each piece of SMA wire 32 extends along a side of the camera unit 10 perpendicular to a notional line radial of the optical axis O. In addition, the crimping members 33 provide electrical connections to the piece of SMA wire 32, allowing a drive current to be supplied through the piece of SMA wire 32, and are electrically connected to the PCB 14 on the lowermost side of the camera unit 10

The piece of SMA wire 32 of each SMA actuator 31 is hooked over a respective hook 34 (shown in dotted outline) which is fixed to the support structure 2, so that each piece of SMA wire 32 extends between the camera unit 10 and the support structure 2 at an acute non-zero angle to the optical axis O. In each SMA actuator 31, the piece of SMA wire 32 is held in tension, thereby applying a component of force in a direction along the optical axis O. The two portions of the piece of SMA wire 32 extending between the camera unit 10 and the support structure 2 on either side of the hook 34 each extend perpendicular to a common notional line radial of the optical axis O, as a result of the SMA wire 32 being arranged along a side of the camera unit 10. Thus there is no component of force perpendicular to the optical axis O which is advantageous in that the SMA actuators 31 do not apply sideways forces to the camera unit 10.

A pair of SMA actuators 31 on opposite sides of the support structure 2 together form a subsystem 35 that, on differential contraction, drives rotation of the camera unit 10 around a notional axis perpendicular to the optical axis O and parallel to the sides of the support structure 2 along which the SMA actuators 31 extend. Thus, the notional axes of the two subsystems 35 are perpendicular, so that the SMA actuator system 30 as a whole is capable of driving tilting about any arbitrary axis perpendicular to the optical axis O on selective actuation of the two subsystems 35. Thus, the SMA actuator system 30 creates the desired virtual pivot for the camera unit 10 by operating all the SMA actuators 30 with controlled drive signals, the drive signals applied to the SMA actuators 31 of each subsystem 35 including a differential component selected to provide the desired tilt around the respective notional axis.

However, the SMA actuators 31 of the two subsystems 35 are arranged so that the component of force along the optical axis O is applied in opposite directions A and B by the two subsystems 35. That is, the SMA actuators 31 of one subsystem 35 extend upwardly (as shown in FIG. 3) and thereby apply a component of force to the camera unit 10 in the direction A upwardly, whereas the SMA wires 32 of the other pair of actuators 31 extend downwardly (as shown in FIG. 3) and thereby apply a component of force to the camera unit 10 in the opposite direction B downwardly. As a result of the arrangement of the SMA actuators 31, the SMA actuators 31 of the subsystems 35, on contraction, drive displacement of the camera unit 10 in opposite directions along the optical axis O so that the subsystems 35 apply a stress to each other that can be controlled by varying the heating of the SMA actuators 31.

In this arrangement, the suspension system 20 is optional in that the camera unit 10 could alternatively be supported solely by the SMA actuator system 30. In this case, the camera unit 10 has no restraints on its movement except as imposed by the SMA actuator system 30 and so the camera unit 10 remains able to tilt around two axes perpendicular to the optical axis O upon actuation of the SMA actuation system 30.

Reference is made to WO-2010/089529 for further details of the first arrangement thereof, and also details of the second arrangement thereof, that may be applied in the camera apparatus 1 described herein.

The electrical arrangement of the camera apparatus 1 will now be described.

The PCB 14 mounts a control circuit 42, described further below and shown in FIG. 5, for generating drive signals that are supplied to the SMA actuators 31. As an alternative, the control circuit 42 could be provided on the support structure 2.

In the case of the modified camera apparatus shown in FIG. 2, the control circuit 42 may additionally generate drive signals that are supplied to the SMA actuation system 3 to drives the variable focus of the camera unit 10, for example in the manner described in detail in WO-2007/113478, WO-2008/099156 or WO-2009/056822, which are incorporated herein by reference. In particular, the control circuit 42 may use a closed loop resistance-feedback technique in which the control circuit 42 measures the resistance of the SMA actuators 4 and varies the drive signals using the measured resistance as a feedback signal to drive the measured resistance to a desired value.

Figure 5:
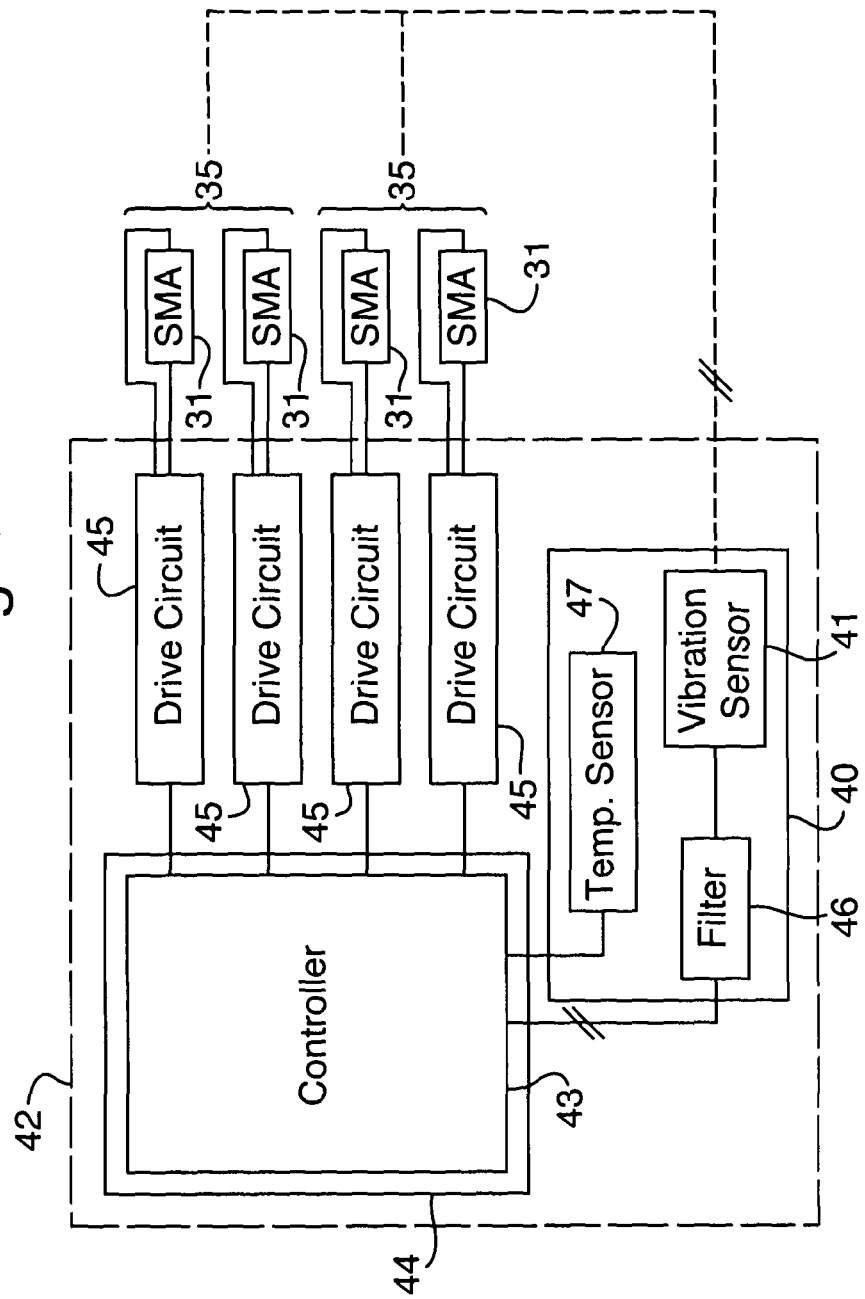
FIG. 5 is a diagram of the control circuit of the camera apparatus.

The control circuit 42 is shown in FIG. 5 and its operation to generate drive signals to control the SMA actuation system 10 that tilts the camera unit 10 will now be described.

The PCB 14 of the camera unit 10 also mounts a sensor unit 40 including a sensor arrangement 41 that outputs output signals representative of the angular velocity of the camera unit 10, thereby detecting the vibrations that the camera unit 10 is experiencing. The sensor arrangement 41 typically comprises a pair of gyroscopes, for detecting vibration around two respective axes perpendicular to the optical axis O and each other. The derivation of drive signals is simplified if the axes around which the respective gyroscopes detect vibration are aligned with the notional axes around which the subsystems 35 of the SMA actuator system 10 drive tilting, but this is not essential. In general, larger numbers of gyroscopes or other types of vibration sensor could be used.

The control circuit 42 comprises a controller 43 that may be implemented in an integrated circuit (IC) chip 44, for example by a suitably programmed processor. The output signals of the sensor arrangement 41 are supplied to the controller through a filter 46 that forms part of the sensor unit 40. Many MEMS gyroscope sensor units are commercially available integrated with a suitable filter that may be configured to act as the filter 46 of the control circuit 42. The filter characteristics of filter 46 are discussed below.

On the basis of the output signals of the sensor arrangement 41, the control circuit 42 generates the drive signals that are supplied to the SMA actuators 31. This is achieved as follows.

Each SMA actuator 31 has a respective drive circuit 45 that generates a drive signal in correspondence with a power control signal supplied from the controller 43 that represents the desired power of the drive signal. The drive signals are supplied from the drive circuits 45 to the respective SMA actuators 31. The drive circuits 45 each have identical construction.

The drive circuits 45 may be a constant-voltage current source or a constant-current current source. For example, in the latter case the constant current might be of the order of 120 mA. Advantageously, the drive circuits 45 generate a PWM (pulse width modulation) drive signal whose duty cycle is varied in correspondence with the power control signal to vary the power of the drive signal, although in principle the drive circuits 45 could vary the voltage and/or current of the drive signals.

The controller 43 generates the power control signals in respect of each SMA actuator 31 on the basis of the output signals of the sensor arrangement 41 in accordance with a closed-loop control algorithm. The power control signals are generated to vary the power of the drive signals on the basis of the output signals of the sensor arrangement 41 alone, in particular without dependence on any measurement of the resistance of the SMA actuators 31. This is achieved by the controller 43 generating closed-loop control signals for each SMA actuator 31 representing the desired power variation, from the output signals of the sensor arrangement 41 alone. The controller 43 adds the closed-loop control signals to set-point control signals to generate the power control signals. The set-point control signals cause the drive signals to have a set-point power, that varies more slowly than the closed-loop control signals, typically being fixed for period of operation. Thus, the closed-loop control signals cause a variation in power from the set-point power.

As the power control signals represent the desired power of the drive signals, they effectively represent the degree of actuation required from the respective SMA actuators 31 to compensate for the vibration represented by the output signals of sensor arrangement 41. Thus, the closed-loop control signals are generated under closed-loop control that tends to reduce the vibrations represented by the output signals of the sensor arrangement 41, the closed-loop control algorithm for generating closed-loop control signals being designed to achieve this.

The closed-loop control signals vary for each SMA actuator 31 depending on the orientation of the vibration represented by the output signals of the sensor arrangement 41. As the SMA actuator system 30 comprises two subsystems 35 each comprising a pair of SMA actuators 31, each subsystem 35 is controlled to reduce vibrations around its respective axis perpendicular to the optical axis. If the sensor arrangement 41 comprises a pair of gyroscopes whose axes are aligned with the subsystems 35, then the desired degree of vibration from each subsystem 35 is derived from the output signal from one gyroscope. This simplifies the control process as the closed-loop control signals of each subsystem can be derived from one output signal. However, in the case of misalignment, or a sensor arrangement 41 that provides more output signals, simple trigonometry may be applied to derive required degree of vibration from each subsystem 35 from a linear combination of the output signals.

As each subsystem comprises a pair of SMA actuators 31, the closed-loop control signals for the pair of SMA actuators 31 in a subsystem 35 are generated to provide a differential displacement providing the required degree of tilt around the corresponding notional axis perpendicular to the optical axis O. To the extent the system is linear, the difference between the closed-loop control signals for the pair of SMA actuators 31 in a subsystem 35 represents the demanded angle of tilt around that axis. For simplicity, this is achieved by the closed-loop control signals for each SMA actuator of the pair being the inverse of each other. However, in the case differing numbers or arrangements of SMA actuators 31, simple trigonometry may be applied to derive required power control signal for each SMA actuator from a linear combination of the required vibration around each axis.

The closed-loop control signals include at least a component derived to be proportional to the position of the camera unit 10. In the simplest form, proportional control is applied without the closed-loop control signals having any other component. Alternatively, a more complex control algorithm are applied, for example proportional-integral control in which the closed-loop control signals also include a further component derived to be proportional to the integral of the position of the camera unit 10. As the output signals of the sensor arrangement 41 are representative of the position of the camera unit 10, the controller 43 first integrates the output signals to derive a measure of the position of the camera unit 10 and derives the closed-loop control signal therefrom.

A high degree of accuracy of control may be achieved because the sensor arrangement 41 is mounted on the camera unit 10, rather than the support structure 2, and closed-loop control of the power of the drive signals is performed.

Such a control circuit 42 is very simple to implement. Apart from the fact that no detection circuit is required to detect the resistance of the SMA actuators 41, the closed-loop control algorithm is much simpler. In particular, as a result of the sensor arrangement 41 being mounted on the camera unit 10 which is the moving part to be stabilised, accurate control can be achieved by a simple closed-loop control of the power of the drive signals. This allows sufficient accuracy to be achieved, despite the non-linearities and variations in the response of the SMA actuators. It has been appreciated that the closed-loop control of power is far less sensitive to those non-linearities and variations simply by using a large control loop gain. Even without calibration of the control circuit 42, the control loop can maintain nulls in the output signals of the sensor arrangement and thus perform well. Thus, the camera apparatus 1 may be created with minimal investment in custom electronics hardware, and extra components.

The simplicity of the control algorithm makes the control circuit 42 straightforward to implement, for example forming the controller 43 from a simple processor executing appropriate software and allowing the drive circuits 45 to have a simple construction, for example as FETs (field effect transistors). In this way, a commercially attractive control circuit 42 may be constructed from off-the-shelf components, allowing significant reduction in the time to market for a new product. Indeed, the simplicity of the control algorithm also opens up the possibility of implementing the controller 42 in spare processor and software storage capacity that may often be provided on a commercially available sensor unit 40, meaning that no extra processor is required. This limits the required additional hardware to the driver circuit 45, and potentially a few other passive components (such as resistors and capacitors).

The SMA actuator system 30 may be provided with a sufficient speed of response to provide OIS. Typically each SMA actuator 31 is driven to control the position over a frequency bandwidth up to 10 Hz, up to 20 Hz, or up to 30 Hz.

A perceived drawback of SMA material as an actuator is its slow response time. As the SMA actuators 31 are thermally driven, the response time is limited by the temperature change achievable, being associated with thermal conductivity, specific heat capacity, and thermal mass. Whilst heating of the SMA actuators 31 can be increased by increasing the power of the drive current, cooling is dependent on the thermal arrangement of the SMA actuators, notably including the thickness of the piece of SMA wire 32. This thickness is selected to provide the desired response time during cooling. The piece of SMA wire 32 may be of thickness 25 µm which provides a thermal response that begins to roll off at 4 Hz. Based on analysis of the OIS function, the functional requirement is to provide movement compensation over a bandwidth of up to 30 Hz. However, the amplitude of response required drops markedly over the operating bandwidth, so as to only require less movement (say less than 10 μm at over 20 Hz). Surprisingly, in spite of the roll-off in SMA wire response above 4 Hz, the SMA actuators 31 formed from a piece of SMA wire 32 are still able to deliver the displacement requirements at 30 Hz, and are able to successfully meet the actuation requirements of the OIS for miniature cameras.

The filter characteristics of filter 46 will now be discussed

The filter 46 may act as a low-pass filter by filtering out frequency components of relatively high frequency for the purpose of removing noise in the output signals of the sensor arrangement 41. The cut-off frequency (defined as the frequency at which the filter characteristic is 50% of the maximum) may be at the upper end of the functional range required for OIS, for example at 30 Hz.

The filter 46 may additionally or alternatively act as a high-pass filter by filtering out frequency components of relatively low frequency to improve the OIS function in the following manner. The user may legitimately want to pan the camera apparatus 1 around. Under such circumstances, it is undesirable to try and maintain a particular orientation as this will lead to the SMA actuator system 30 saturating at its maximum movement capability and staying there, thereby preventing the OIS function. It has been appreciated that this problem may be avoided by applying a high-pass filter characteristic. The output signals are attenuated below a particular angular velocity such that the control loop returns the SMA actuators 31 to a mid-position. As a result, when a user pans around slowly to look at different objects, the camera body will follow. The cut-off frequency (defined as the frequency at which the filter characteristic is 50% of the maximum) may be selected to allow panning at a desired speed. Typically, the cut-off frequency is at least 0.5 Hz, more preferably at least 1 Hz or at least 2 Hz. Typically, the cut-off frequency is at most 5 Hz, more preferably at most 3 Hz.

The control of the set-point powers of the SMA actuators 31 will now be discussed.

The set-point powers are controlled by selecting the set-point control signals for each SMA actuator 31, to which the closed-loop control signals are added to generate the power control signals.

The closed-loop control signals vary the powers of the drive signals about the set-point powers to implement the OIS function. Thus, relative to the speed of the OIS function, the set-point powers are effectively fixed. This means that the set point powers may be fixed when the control circuit is switched on, or at least vary more slowly than the closed-loop control signals, typically at least an order of magnitude more slowly, for example at less than 0.1 Hz.

The set-point powers determine the length of the SMA actuators 31 and hence the position of the camera unit 10 relative to the support structure 2 in the absence of vibration. This is the centre of the oscillatory movement of the camera unit 10 relative to the support structure 2. The OIS function aims for this to be a fixed absolute position of the camera unit 2.

Thus, the set-point powers are selected to position the camera unit 10 sufficiently far from the limits of the movement relative to the support structure 2 to provide correction of the desired magnitude of vibration. The ideal position of the camera unit 10 to be set by the set-point powers is at the centre of its range of movement relative to the support structure 2 to achieve correction of the maximum possible magnitude of vibration. However, some error from this ideal position is acceptable, albeit that the magnitude of vibration that may be corrected is correspondingly reduced.

The set-point powers are selected having regard to the physical arrangement of the camera apparatus 1 and in particular the SMA actuators 31, taking account of the mechanical and thermal properties. The set-point powers may be derived theoretically or experimentally by taking measurements of position for drive signals of different powers.

The set-point powers corresponding to any desired position vary with ambient temperature. Whilst the set-point power for operation at a given ambient temperature may be determined in advance for a given arrangement of the camera apparatus 1, the controller 42 is configured to control the set-point power in a manner that varies with ambient temperature for optimal performance over typical consumer electronics temperature ranges. Any of the following approaches may alternatively be applied.

In one approach, the controller 42 selects the set-point powers on the basis of a measure of ambient temperature. This selection may be performed using a look-up-table or a simple equation to define the set-point power and range. Such an estimate can be used stand-alone or to provide a start-point of a second finer search.

To provide the measure of ambient temperature, the control circuit 42 may include a temperature sensor 47 that measures the ambient temperature. The output signal of the temperature sensor 47 is supplied to the controller 42 that derives the set-point control signal on the basis thereof. In practical terms, the required accuracy of temperature measurement is relatively low. This allows advantage to be taken of temperature sensors that are commonly provided in consumer electronics apparatuses for other purposes. For example, in the control circuit of FIG. 5, the temperature sensor 47 is a component of the sensor unit 41, as is commonly the case for commercially available vibration sensor units such as MEMS products.

Alternatively, to provide the measure of ambient temperature, the controller 43 may determine the measure of temperature from measured electrical characteristics of the SMA actuators 31, for example based on the measured resistance of the SMA actuators 31 although this has the disadvantage of requiring measurement of the resistance of the SMA actuators 31 which is not needed for control. Various electrical characteristics of SMA material are dependent on ambient temperature, for example the difference between the resistance of the SMA actuator 31 in the unheated state when the drive signal is initially applied and the local maximum resistance of the SMA actuator 31 or the power of the drive current required to hold the resistance of the SMA actuator 31 at a predetermined level relative to the maximum resistance and/or minimum resistance of the SMA actuator 31. Examples of suitable electrical characteristics and techniques for measuring them that may be applied in the present control circuit 42 are disclosed in WO 2009/071898 that is incorporated herein by reference.

Alternatively, in the case of the modified camera apparatus shown in FIG. 2, to provide the measure of ambient temperature, the controller 43 may determine the measure of temperature from measured electrical characteristics of the SMA actuators 4 of the SMA actuator system 3 that provides the variable focus of the camera unit 10, for example based on the measured resistance of those SMA actuators 4. This has the advantage of not requiring measurement of the resistance of the SMA actuators 31 that drive tilting of the camera unit 10. Various electrical characteristics of SMA material are dependent on ambient temperature, for example the difference between the resistance of the SMA actuator 4 in the unheated state when the drive signal is initially applied and the local maximum resistance of the SMA actuator 31 or the power of the drive current required to hold the resistance of the SMA actuator 31 at a predetermined level relative to the maximum resistance and/or minimum resistance of the SMA actuator 31. Examples of suitable electrical characteristics and techniques for measuring them that may be applied in the present control circuit 42 are disclosed in WO 2009/071898 which is incorporated herein by reference.

Although such techniques will be reasonably effective, accuracy can be improved by considering the ambient temperature in the vicinity of the SMA actuators 31 which will increase with time when power is supplied due to the heat produced in the SMA actuators 31 and indeed other components of the camera apparatus 1 such as the sensor unit 40. In the case that a temperature sensor 47 is used, this will provide an accurate measure of the ambient temperature in the vicinity of the SMA actuators 31 if the camera apparatus 1 has been inactive for a sufficient period for heat transfer to have equalised temperatures. Otherwise, some error may be introduced by a temperature distribution between the temperature sensor 47 and the SMA actuators 31, that depends on where the temperature sensor 47 is located relative to the SMA actuators 31 on the time since the last temperature measurement was made. Similarly, in the case that a measure of temperature is derived from measured electrical characteristics of the SMA actuators 31, this will this will provide an accurate measure of the ambient temperature in the vicinity of the SMA actuator 1 at the time of measurement, but there may be an error introduced by subsequent rise (or lowering) of the ambient temperature in the vicinity of the SMA actuators 31, that depends on the time since the last temperature measurement was made.

To improve the measure of the ambient temperature by compensating for such errors, it is possible to derive a measure of the ambient temperature in the vicinity of the SMA actuators 1 using a thermal model of the camera apparatus 1 that relates at least one characteristic temperature of the camera apparatus 1, including the ambient temperature in the vicinity of the SMA actuators 31, on the basis of the power of the drive current supplied to the SMA actuators 31. This thermal model models the heating of the environment around the SMA actuators 31, which is essentially the elements of the camera apparatus 1 and the background ambient temperature in which the camera apparatus 1 is situated. As the environment around the SMA actuators 31 is heated by the drive current passing through the SMA actuator, the thermal model relates the at least one characteristic temperature to the power of the drive current, in particular based on the history of the power that has been supplied over time. An example of such a thermal model is as follows.

Heating relationships are generally exponential in nature. For example, an appropriate formula describing the instantaneous temperature T of an object at time t in an environment of ambient temperature Tamb at initial temperature (Tamb+Texcess) would be:

$$T = Tamb + (Texcess \cdot \exp(-t/\tau))$$

where τ is a time constant of the heat transfer from the object to the environment. Due to the time quantisation inherent in digital control, it is convenient for the control circuit 42, in particular the controller 43, to employ a thermal model represented by differential forms of this equation.

At simplest, the thermal model represents just a single characteristic temperature T that is the ambient temperature in the vicinity of the SMA actuators 31 and in a differential notation is of the form:

$$\Delta T = (P/W) - ((T - Tamb)/\tau)$$

where T is the instantaneous value of the characteristic temperature, Tamb is the background ambient temperature of the camera apparatus 1, ΔT is the change of the characteristic temperature in a given period, P is the power applied in that period, W is heat transfer constant, ie a heat capacity, and t is a thermal time constant.

The thermal model in this differential notation may be used to update, continuously or periodically, the instantaneous temperature T, whose initial value may be assumed to the background ambient temperature Tamb determined using one of the above techniques, for example derived from the output of the temperature sensor 47 or derived from measured electrical characteristics of the SMA actuators 31.

The thermal model also takes into account the background ambient temperature Tamb of the camera apparatus 1. This is because heat transfer occurs from the camera apparatus 1 to the environment around it that may be assumed to have an invariant temperature, that is the background ambient temperature. The ambient temperature Tamb is derived by the control unit 52 as described further below.

The parameters W and τ have physical significance and may be thought of as notionally being the thermal constants of the components of the camera apparatus 1. They have fixed values which are typical of the design of the camera apparatus 1. They may be determined through experimentation and characterisation of the camera. This may be done generically for all camera apparatuses 1 of a given design, or in principle from measurements performed in respect of an individual camera apparatus 1 either during manufacture or even during use by the control unit 52 performing a calibration operation prior to use.

The parameter τ is a thermal transfer time constants (for example, the time of a component to lose 63.2% of its temperature differential to ambient when the heat source is completely removed) and the constant W is a heat capacity (for example the energy per ° C. temperature rise). Due to this physical significance, it is possible to estimate all of these parameters from simulation or experiment, for example by holding a constant power in the active range of the SMA actuator 31, and then monitoring drift in resistance. From such measured data, it is possible to extract an exponential responses. The time constant of this response curve is sufficient to set the parameter τ directly. The final magnitude of response of each of this exponential determines the constant W.

Additional accuracy can be achieved by employing a multi-stage thermal model of plural characteristic temperatures T1, T2, . . . , Tn. in which each successive characteristic temperatures after the first is derived from a previous characteristic temperature. Mathematically the thermal model can be expanded to any arbitrary order in the manner described in WO-201/0049689 which is incorporated herein by reference. Physically speaking, there can be many parts of the thermal environment of the SMA actuators 31, for example different physical components of the camera apparatus 1, each with their own magnitude and time constant. Thus a multi-stage thermal model can provide greater accuracy, albeit at the cost of greater complexity and calculation.

In another approach for controlling the set-point powers to vary with ambient temperature, the controller 43 selects the set-point powers on the basis of the output signals of the sensor arrangement 41. Typically, the response of the SMA actuators 31 (i.e. the magnitude of movement with respect to a given change in the power of the drive signal) is greatest at the centre of the range of movement which corresponds to the most desirable set-point power. Hence it is possible to use the output signals of the sensor arrangement 41 to select the set-point powers.

Figure 7:
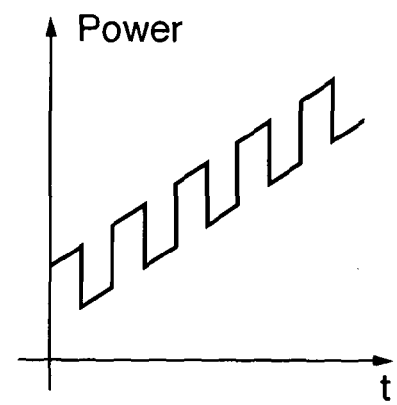
FIG. 7 is a graph of a dithered ramp drive signal over time.
Figure 8:
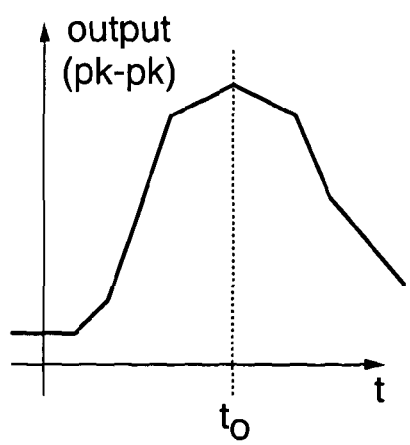
FIG. 8 is a graph of the magnitude of vibration over time when the dithered ramp drive signal of FIG. 6 is applied to an SMA actuator.

A set-point selection process that is an example of this approach is now described with reference to the graphs of FIGS. 6 to 8.

Figure 6:
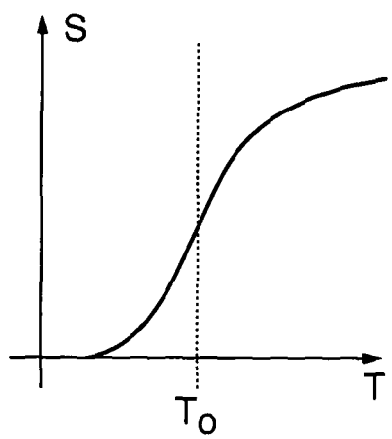
FIG. 6 is a graph of strain against temperature for an SMA actuator.

FIG. 6 illustrates how the strain S of an SMA actuator 31 changes with temperature T (and hence the power of the drive signal). The strain increases over the phase change of the SMA material, initially at a rate ($\Delta S/\Delta T$, corresponding to the slope of the graph) that starts, gradually increases, reaching a maximum at temperature $T_0$ and then gradually decreases. The temperature $T_0$ corresponds to the middle of the phase change and hence the middle of the range of movement.

Each SMA actuator 31 is supplied with a dithered drive signals whose power dithers and whose average power (for example measured over the period of the dither) varies. An example of a suitable dithered power signal is the dithered power ramp shown in FIG. 7 in which the dither is a rectangular power dither and the variation in average power is a linear ramp over time. However, the dithered power signal may use dithers with other waveforms and/or may vary in other manners, for example stepwise.

The output signals of the sensor arrangement 41 are monitored while the dithered drive signals are supplied. The set-point power for each SMA actuator 31 is selected to be the average power of the dithered drive signal when the output signals of the sensor arrangement indicate that the movement of the camera unit 10 is maximised. For example, FIG. 8 shows the magnitude (peak-to-peak) of the output signals of the sensor arrangement 31 (in an orientation corresponding to the movement driven by the SMA actuator 31 in question) when the dithered power ramp of FIG. 7 is applied. In this case, the magnitude is a maximum at time $t_0$ which corresponds to the time when the dithered power ramp drives the temperature of the SMA actuator to temperature $T_0$ when the strain has the maximum variation with temperature. As this is the middle of the range of movement, the average power of the drive signal at time $t_0$ may be used as the set-point power.

The invention claimed is:

1. A camera apparatus comprising:
   a support structure;
   a camera unit comprising an image sensor and a lens system for focussing an image on the image sensor, the camera unit being supported on the support structure in a manner allowing the camera unit to tilt relative to the optical axis of the lens system;
   a plurality of SMA actuators arranged to drive tilting of the camera unit;
   a sensor arrangement mounted on the camera unit and arranged to generate output signals representative of the movement of the camera unit; and
   a control circuit arranged to generate drive signals and supply them to the SMA actuators, wherein
   the control circuit is arranged to derive closed-loop control signals representative of a desired degree of variation in the power of the drive signals from the output signals of the sensor arrangement for reducing the movement of the camera unit, without dependence on any measurement of the resistance of the SMA actuators, and
   the control circuit is arranged to generate the drive signals with powers that vary from set-point powers in correspondence with the closed-loop control signal.

2. The camera apparatus according to claim 1, wherein the closed-loop control signals are, or include respective components that are, derived from the output signals of the sensor arrangement to be proportional to the position of the camera unit.

3. The camera apparatus according to claim 1, wherein the closed-loop control signals include respective components that are derived from the output signals of the sensor arrangement to be proportional to the position of the camera unit and further respective components derived from the output signals of the sensor arrangement to be proportional to the integral of the position of the camera unit.

4. The camera apparatus according to claim 1, wherein the sensor arrangement is arranged to generate output signals representative of the angular velocity of the camera unit.

5. The camera apparatus according to claim 4, wherein the sensor arrangement is a gyroscope sensor arrangement.

6. The camera apparatus according to claim 4, wherein the control circuit is arranged to integrate the output signals of the sensor arrangement to derive a measure of the position of the camera unit and to derive the closed-loop control signal from the derived measure of the position of the camera unit.

7. The camera apparatus according to claim 1, wherein the control circuit is arranged to select the set-point powers on the basis of a measure of ambient temperature in the vicinity of the SMA actuators.

8. The camera apparatus according to claim 7, wherein the control circuit includes a temperature sensor for measurement of the ambient temperature and said measure of the ambient temperature is derived from an output signal of the temperature sensor.

9. The camera apparatus according to claim 7, wherein the control circuit is arranged to determine said measure of temperature from measured electrical characteristics of the SMA actuators.

10. The camera apparatus according to claim 7, wherein the control circuit is arranged to derive an estimate of at least one characteristic temperature of the SMA actuation apparatus, including the ambient temperature in the vicinity of the SMA actuators, on the basis of the power of the drive current, using a thermal model that relates the at least one characteristic temperature of the SMA actuation apparatus to the power of the drive current.

11. The camera apparatus according to claim 7, wherein the camera unit comprises:
    a camera support on which the image sensor is mounted, the lens system being suspended on the camera support in a manner allowing movement of the lens system to change the focus of an image on the image sensor; and
    at least one further SMA actuator connected between the camera support and the lens system for driving movement of the lens system to change the focus, and
    the control circuit is arranged to determine said measure of temperature from measured electrical characteristics of the at least one further SMA actuator.

12. The camera apparatus according to claim 11, wherein the control circuit is arranged to measure the resistance of the at least one further SMA actuator connected between the camera support and the lens system and to generate further drive signals based on the measured resistance and to supply the drive signals to the at least one further SMA actuator, and
    the control circuit is arranged to determine said measure of temperature from measured electrical characteristics of the at least one further SMA actuator based on the measured resistance of the at least one further SMA actuator.

13. The camera apparatus according to claim 1, wherein the control circuit is arranged to select the set-point powers on the basis of the output signals of the sensor arrangement.

14. The camera apparatus according to claim 13, wherein the control circuit is arranged to perform a set-point power selection process comprising:
supplying the SMA actuators with dithered drive signals having a power that dithers and has a changing average power over a predetermined period;
monitoring the output signals of the sensor arrangement while said dithered drive signals are supplied; and
selecting the set-point powers to be the average power of the dithered drive signals when the output signals of the sensor arrangement indicate that the movement of the camera unit is maximised.

15. The camera apparatus according to claim 1, wherein the control circuit comprises:
a drive circuit arranged to generate the drive signals in correspondence with power control signals; and
a controller arranged to generate the power control signals.

16. The camera apparatus according to claim 15, wherein the controller is arranged to generate the power control signals by adding the closed-loop control signals to set-point control signals for causing the drive signal to have the set-point powers.

17. The camera apparatus according to claim 1, further comprising a suspension system comprising a plurality of flexure elements supporting the camera unit on the support structure.

18. The camera apparatus according to claim 1, wherein the plurality of SMA actuators consists of two SMA actuator subsystems each comprising plural SMA actuators connected between the camera unit and the support structure, the respective SMA actuator subsystems being arranged, on contraction of the actuators thereof, to drive displacement of the camera unit in opposite directions along the optical axis relative to the support structure, and each SMA actuator subsystem being arranged, on differential contraction of the actuators thereof, to drive rotation of the camera unit around a respective one of said notional axes.

19. A method of controlling a drive circuit to generate drive signals for SMA actuators that drive tilting of a camera unit comprising an image sensor and a lens system relative to a support structure from output signals of a sensor arrangement mounted on the camera unit, the method comprising:
deriving closed-loop control signals representative of a desired degree of variation in the power of the drive signals from the output signals of the sensor arrangement without dependence on any measurement of the resistance of the SMA actuators, and
generating power control signals for controlling the drive circuit to generate drive signals for the SMA actuators with powers that vary from a set-point power in correspondence with the closed-loop control signal.

20. A controller for controlling a drive circuit to generate drive signals for SMA actuators that are arranged drive tilting of a camera unit comprising an image sensor and a lens system relative to a support structure, from output signals of a sensor arrangement mounted on the camera unit, wherein:
the controller is arranged to derive closed-loop control signals representative of a desired degree of variation in the power of the drive signals from the output signals of the sensor arrangement without dependence on any measurement of the resistance of the SMA actuators, and
the control circuit is arranged to generate power control signals for controlling the drive circuit to generate drive signals for supply to the SMA actuators with powers that varies from a set-point power in correspondence with the closed-loop control signal.

21. The controller according to claim 20, wherein the controller is implemented in a semiconductor chip.

22. The controller according to claim 21, wherein the controller further comprises the sensor arrangement.

23. The control circuit comprising:
a controller according to claim 20, and a drive circuit arranged to generate drive signals for SMA actuators, for driving tilting of a camera unit comprising an image sensor and a lens system relative to a support structure, in correspondence with the power control signals.

* * * * *